US007136570B2

(12) United States Patent
Wu

(10) Patent No.: US 7,136,570 B2
(45) Date of Patent: Nov. 14, 2006

(54) ALGORITHM TO PRINT DV DATA TO A DV DECK WITH FRAME ACCURACY

(75) Inventor: Yee J. Wu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1274 days.

(21) Appl. No.: 09/925,732

(22) Filed: Aug. 10, 2001

(65) Prior Publication Data

US 2002/0028062 A1    Mar. 7, 2002

Related U.S. Application Data

(60) Provisional application No. 60/224,910, filed on Aug. 11, 2000.

(51) Int. Cl.
*H04N 5/93* (2006.01)
(52) U.S. Cl. .......................................... 386/52; 386/95
(58) Field of Classification Search .................. 386/46, 386/52, 55, 95; 360/13, 73.01
See application file for complete search history.

(56) References Cited

U.S. PATENT DOCUMENTS 4,363,049 A * 12/1982 Ohtsuki et al. ............... 360/13
5,903,702 A *  5/1999 Sugiyama et al. ............ 386/52
5,969,897 A * 10/1999 Morita ..................... 360/73.01
6,628,889 B1 *  9/2003 Inoue ........................... 386/52
2003/0134590 A1 *  7/2003 Suda et al. ................. 455/3.06

OTHER PUBLICATIONS http://www.microsoft.com/DIRECTX/dxm/help/ds/Oview/About_DS_Filter_Graph_Editor.ht. About the DirectShow Filter Graph Editor, pp. 1-3, Aug. 5, 2001.
http://msdn.microsoft.com/library/en-us/dnshow/html/dysupport.asp?frame=true, Digital Video Camcorder Support in Windows 98 and Windows 2000, pp. 1-12, Mar. 19, 1999.

* cited by examiner

*Primary Examiner*—Huy Nguyen
(74) *Attorney, Agent, or Firm*—Banner & Witcoff, Ltd.

(57) ABSTRACT

DV data is streamed to a DV device without losing the leading section of the streaming data, and in a frame-accurate manner by sending a command to the DV device for performing an absolute track number search for a selected track number. A predetermined number of frames of DV data are then pre-rolled. The predetermined number of frames that are pre-rolled depends on the particular DV device. Next, a command is sent to the DV device to place the DV device in a RECORD PAUSE state, and a wait operation of a predetermined period of time is performed. The wait operation of a predetermined number of frames is also based on the particular DV device. A command is sent to the DV device to place the DV device in a RECORD transport state, and DV data is sent to the DV device for recording.

21 Claims, 5 Drawing Sheets

ALGORITHM TO PRINT DV DATA TO A DV DECK WITH FRAME ACCURACY

CROSS-REFERENCE TO RELATED APPLICATION

The present application claims priority to U.S. provisional patent application, Ser. No. 60/224,910, filed Aug. 11, 2000, entitled "Frame Accurate Rendering Of Digital Video Data", invented by Yee J. Wu, and incorporated by reference herein.

BACKGROUND OF THE INVENTION

1. Field of the Invention

The invention relates to a technique for recording data on a digital video device. More particularly, the present invention relates to a method and system for recording digital video data on a digital video device under the control of a digital video application running on a host device.

2. Background of the Related Art

A Digital Video (DV) device, such as a camcorder or tape recorder and player, permits a user to record audio/visual data (DV data) onto a recording medium and output the DV data to, for example, a personal computer (PC) running an application for editing DV data. A user can process the DV data using the application to edit portions of the DV data, delete unwanted portions of the DV data and/or add effects such as fading, visual effects, sound effects, etc. The edited DV data can then be sent back to the DV device for storage on the recording medium of the DV device.

DV device limitations have resulted in possibly losing the leading portion of a stream of DV data when DV data is printed to a DV device from the PC. Additionally, DV device limitations have also resulted in frame-inaccurate assembly editing, that is, the inability to accurately start a recording of streaming DV data at a selected track of a DV medium.

To address the data loss problem, many conventional DV data-editing applications set a DV device to a RECORD mode before DV data is sent to the DV device to avoid losing data. In particular, some currently-available DV devices reject an audio video control (AV/C) RECORD control command when the DV device does not sense data on the bus. While such an operating condition provides the advantage automatically stopping the DV device when recording has finished, i.e., the DV data has ended, data must be on the bus when an AV/C RECORD control command is sent to the DV device at the beginning of a recording operation.

On the other hand, depending on the DV device, the DV device may permit a RECORD PAUSE state before DV data is streamed to the DV device. Such an approach, though, does not entirely avoid data loss for DV devices that permit a RECORD PAUSE state without DV data because some DV devices reject a START RECORDING setting unless there is streaming data present. For example, the RECORD mode for at least two popular DV devices can be set when there is no data on the bus, but both DV devices change their internal plug control registers from "listening" to "broadcast channel 63" so that when an application attempts to program the input Plug Control Register (iPCR), the DV device appears to be busy. Consequently, to overcome this problem, data should be placed on the bus before either of the DV devices is set to the RECORD mode.

Consequently, a DV application cannot simply issue a device control to start recording and then send streaming data without an appropriate delay; otherwise, the beginning portion of the streaming data will be lost.

Yet another problem associated with printing data to a DV device includes that the DV device recording mechanism that is used for locking, or synchronizing, to the streaming DV data sent over an IEEE-1394 serial bus does not respond instantaneously. Still another problem is that the recording mechanism of a DV device that has locked to the streaming data does not provide feedback notification to the host (PC) that the DV device is ready to record. A further problem is that when a DV device transitions between transport states, such as from STOP to RECORD, transitioning is not instantaneous.

What is needed is a technique for streaming DV data to a DV device for storing the DV data on a recording media of the DV device without losing the leading section of the streaming data. What is also needed is a technique for streaming DV data to a DV device for storing the DV data on a recording medium of the DV device in a frame-accurate manner.

BRIEF SUMMARY OF THE INVENTION

The present invention provides a technique for streaming DV data to a DV device for storing the DV data on a recording media of the DV device without losing the leading section of the streaming data. The present invention also provides a technique for streaming DV data to a DV device for storing the DV data on a recording medium of the DV device in a frame-accurate manner.

The advantages of the present invention are provided by a method and a system for streaming DV data to a DV device over, for example, an IEEE-1394 bus, without losing the leading section of the streaming data, and in a frame-accurate manner. According to the invention, a command is sent to the DV device for performing an absolute track number search for a selected track number where recording will begin. Then, a predetermined number of frames of DV data are pre-rolled. The predetermined number of frames that are pre-rolled depends on the particular DV device. The first frame of DV data is then repeatedly sent to the DV device. Next, a command is sent to the DV device to place the DV device in a RECORD PAUSE state, and a wait operation of a predetermined period of time is performed so that the DV device becomes ready to record DV data. A command is sent to the DV device to place the DV device in a RECORD transport state, and DV data is sent to the DV device in a real-time manner for recording. Additionally, a user is queried for information identifying the particular DV device, for example, by displaying a list identifying a plurality of DV devices. Information is then received from the user identifying the particular DV device so that the appropriate number of frames can be pre-rolled for the DV device and the appropriate amount of time will elapse for the DV device to become synchronized with the DV data.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Figure 1:
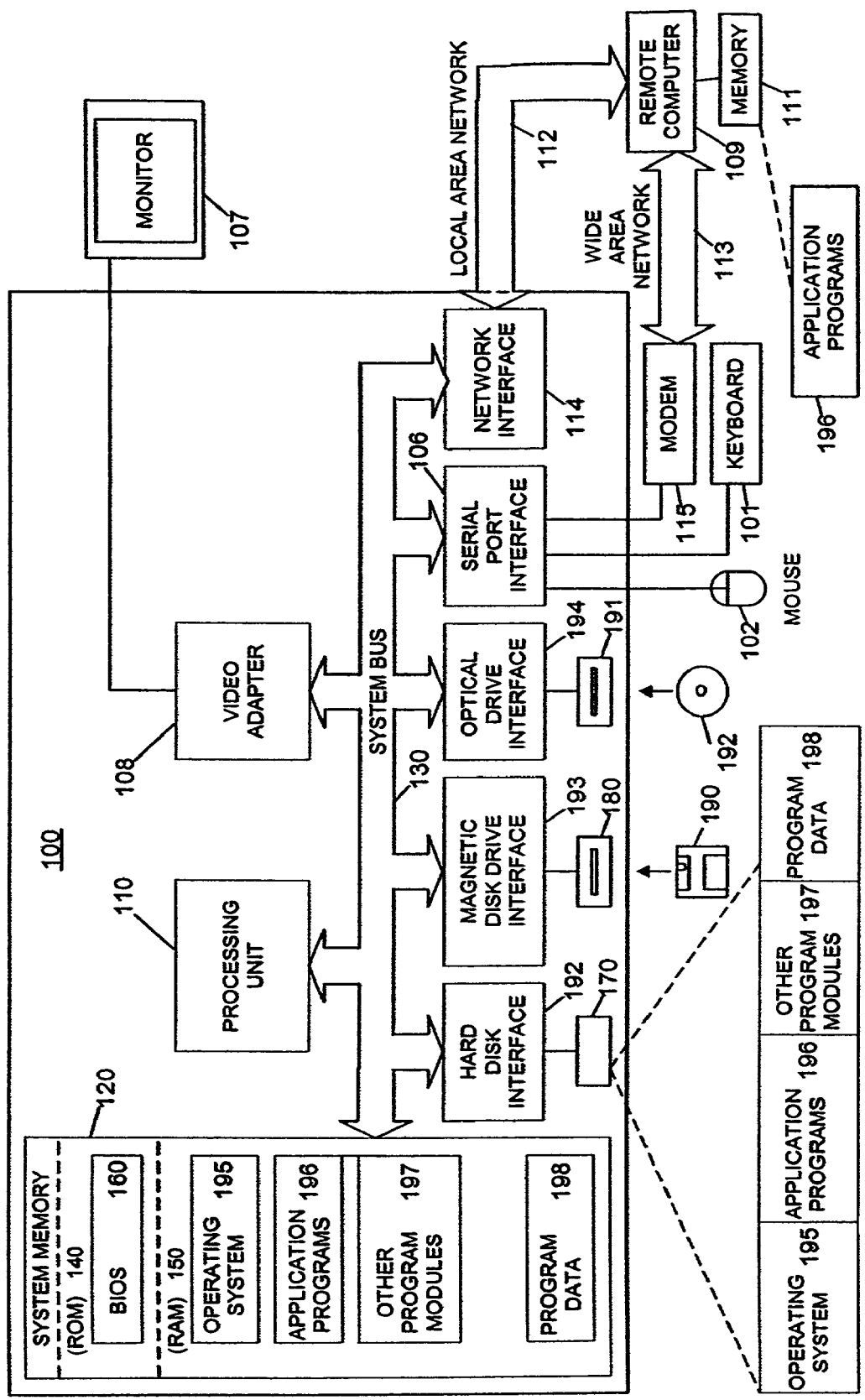
FIG. 1 shows an exemplary computing environment that is suitable for the present invention.

The present invention may be more readily described with reference to FIGS. 1 through 5. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to processing unit 110. System bus 130 may be any of several types of bus structures including a memory bus or memory controller, a peripheral bus, and a local bus using any of a variety of bus architectures. System memory 120 includes read only memory (ROM) 140 and random access memory (RAM) 150.

A basic input/output system 160 (BIOS), containing the basic routines that help to transfer information between elements within computer 100, such as during start-up, is stored in ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. Hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on hard disk drive 170, magnetic disk 190, optical disk 192, ROM 140 or RAM 150, including an operating system 195, one or more application programs 196, other program modules 197, and program data 198. A user can enter commands and information into computer 100 through input devices such as a keyboard 101 and pointing device 102. Other input devices (not shown) may include a microphone, joystick, game pad, satellite dish, scanner or the like. These and other input devices are often connected to processing unit 110 through a serial port interface 106 that is coupled to the system bus, but may be connected by other interfaces, such as a parallel port, game port, a universal serial bus (USB) or an IEEE-1394 serial bus. Further still, these devices may be coupled directly to system bus 130 via an appropriate interface (not shown). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local area network 112 through a network interface or adapter 114. When used in a WAN networking environment, personal computer 100 typically includes a modem 115 or other device for establishing a communications over wide area network 113, such as the Internet. Modem 115, which may be internal or external, is connected to system bus 130 via the serial port interface 106. In a networked environment, program modules depicted relative to personal computer 100, or portions thereof, may be stored in a remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

An illustrative aspect of the invention provides a technique for streaming DV data to a DV device for storing the DV data on a recording medium of the DV device without losing the leading section of the streaming data. Another aspect of the present invention provides a technique for streaming DV data to a DV device for storing the DV data on a recording medium of the DV device in a frame-accurate manner.

Figure 2:
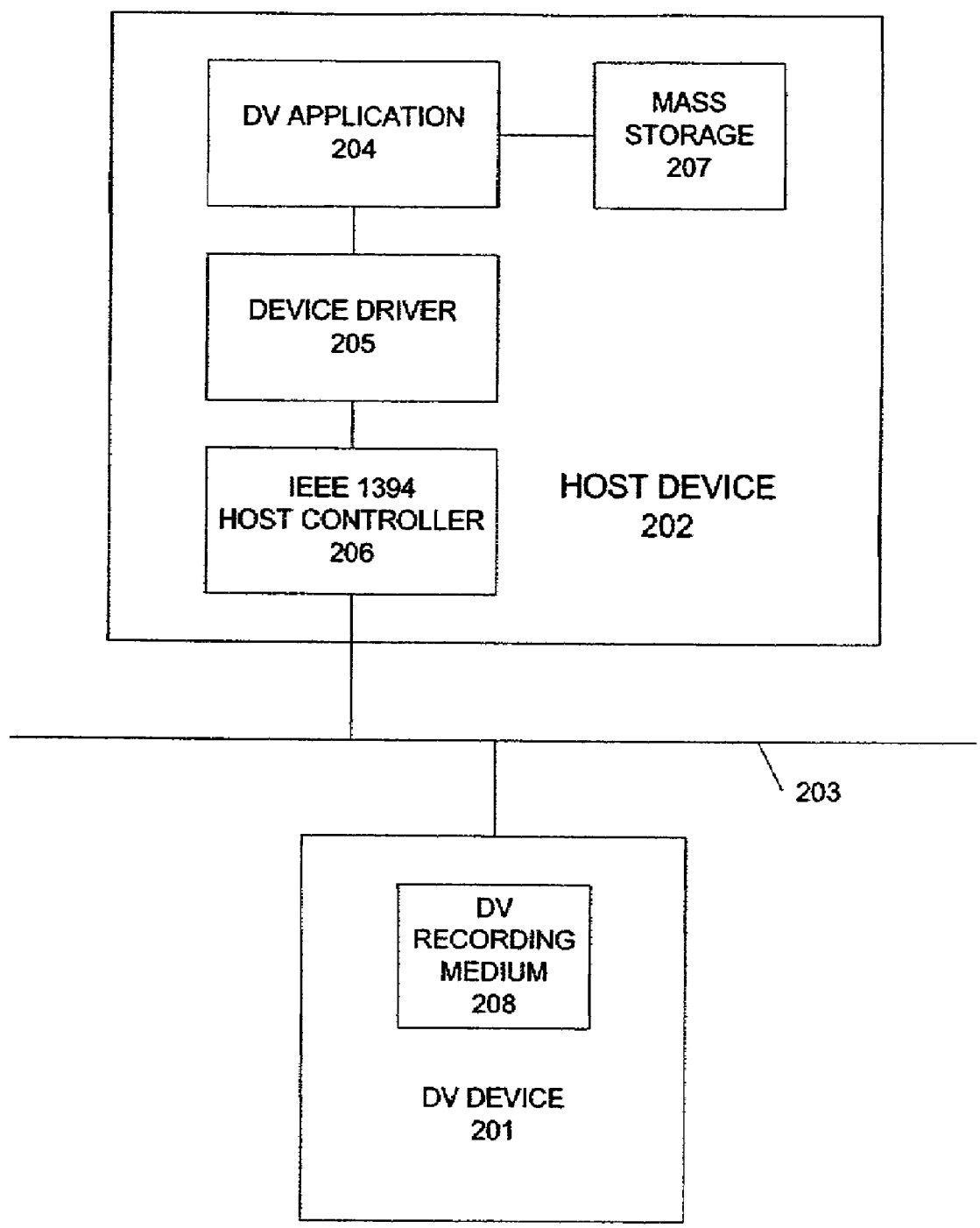
FIG. 2 shows an exemplary arrangement of a DV device and a host device according to the present invention that provides a frame-accurate streaming DV data that is printed back to the DV device without losing the leading section of the streaming data.

FIG. 2 shows an exemplary arrangement of a DV device 201, such as a camcorder or tape recorder/player, and a host device 202, such as a personal computer (PC), in which DV data can be streamed from host device 202 to DV device 201 without losing the leading section of the streaming data and in a frame-accurate manner according to the present invention. Preferably, DV device 201 is coupled to host device 202 through an IEEE-1394 bus 203. Accordingly, DV device 201 includes an IEEE-1394 interface that is not shown. Host device 202 includes a DV application 204, such as "DIRECTSHOW" Filter Graph Editor available from Microsoft, a device driver 205, such as msdv.sys, an IEEE 1394 host controller 206, and a mass storage device 207. Device driver 205 controls the state of DV device 201 directly, but does so by serving requests from application 204. Mass storage device 207 can be any suitable mass storage device, such as a magnetic disk drive, an optical disk drive, or an electronic memory that can store DV data and access the DV data at a rate that is sufficient for streaming DV data to a DV device. It should be understood that host device 202 includes other components, such as a processor, interface devices, etc., such as described in connection with FIG. 1.

Preferably, DV device 201 includes a DV medium 208, such as a magnetic tape, that is formatted with time codes and track numbers in a well-known manner. Additionally, DV device 201 preferably provides support for Audio/Video Control (AV/C) control commands and specifically for an Absolute Track Number (ATN) control command (track searching). According to the invention, two operating parameters of the DV device must be known before DV data is streamed from host device 202 to DV device 201. In particular, the number of frames that must be pre-rolled to compensate for the relative positions of the tape and recording head caused by a transport state change must be known (referred to herein as "a3"), and the time, in units of the number of frames (referred to herein as "a4"), that must elapse after setting DV device 201 to the RECORD transport state before DV device 201 is ready to record must be known. When the broadcast standard is the NTSC standard, a frame has a duration of about 33 milliseconds. When the broadcast standard is the PAL standard, a frame has a duration of about 40 milliseconds. Accordingly, these two operational parameters vary from DV device to DV device.

The following is a list for pre-roll (a3) and RECORD ready wait (a4) for selected exemplary DV devices.

Sony
    PC-1: (a3) 4 frames, (a4) 6 frames
    VX-100: (a3) 4 frames, (a4) 5 frames
Canon
    Elura: (a3) -4 frames, (a4) 28 frames
Panasonic
    PV DV-710: (a3) 3 frames, (a4) 11 frames The streaming state of a DV device, such as the STOP, PAUSE and RUN states, and the transport state of a DV device (in the VTR mode), such as STOP, RECORD PAUSE and RECORD states, are independent of each other and are indirectly controlled by a DV application running on, for example, a PC. When DV data is printed, i.e., streamed, to a DV device, five delays ($t_1$–$t_5$) must be properly applied so that the streaming state can be synchronized to the transport state of a DV device.

Delays $t_1$–$t_5$ are defined as follows. Delay $t_1$ is the time delay, measured in frames, that is required for synchronizing the streaming data on the bus to the recording mechanism of a DV device. Delay $t_2$ is the delay in frames that is required for transitioning a DV device from a STOP (or other transport) state to a RECORD PAUSE transport state. Delay $t_3$ is zero when it can be determined, for example, by polling the DV device, that the DV device has reached the RECORD PAUSE state. Delay $t_4$ is the delay required for transitioning from a DV device from a RECORD PAUSE transport state to a RECORD transport state. Delay t4 is identical to operating parameter (a4) described above. Delay $t_5$ is the delay required for preempting repeated frames that are still queued in bus driver (at most three frames).

Figure 3:
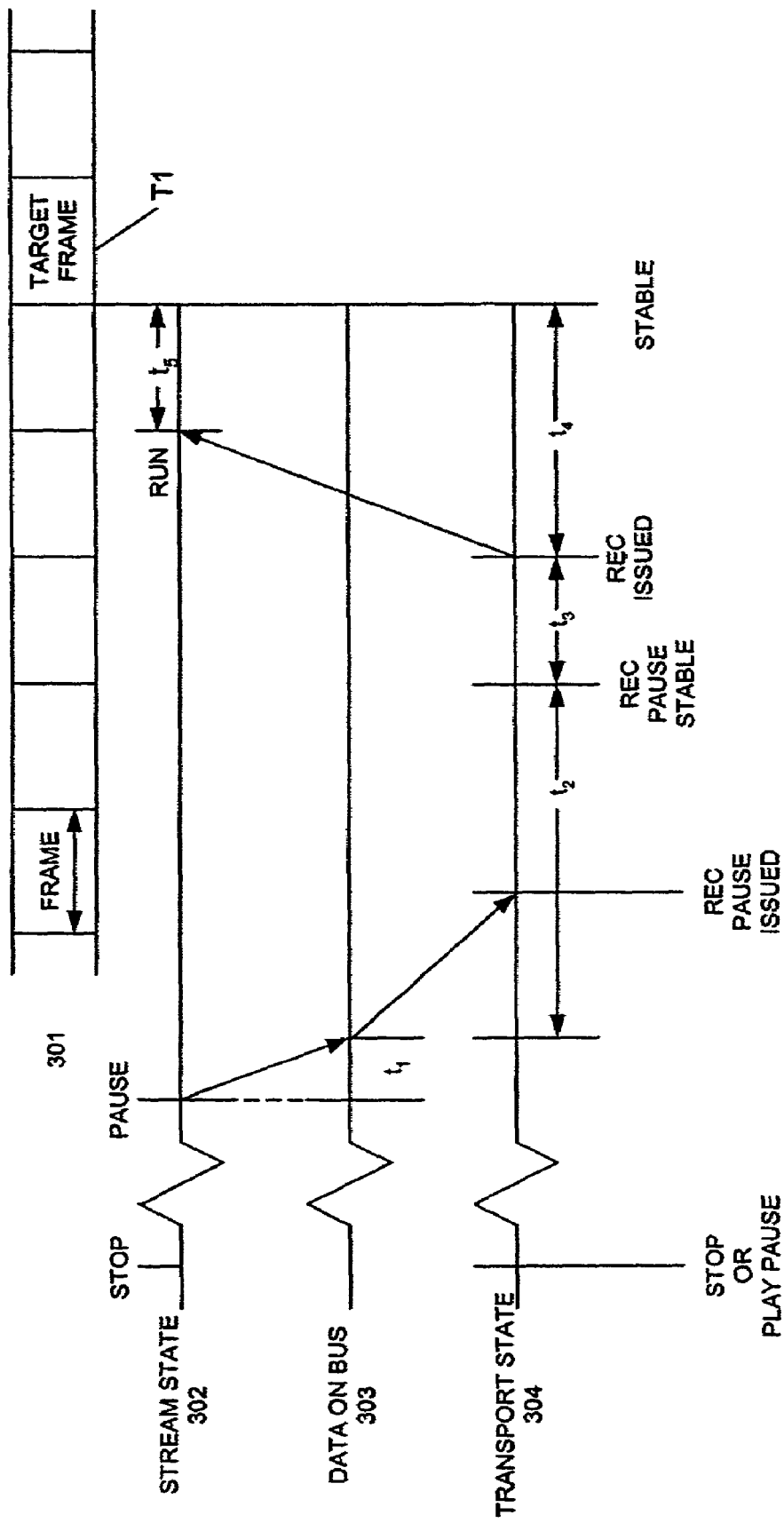
FIG. 3 is a temporal relationship diagram illustrating delays $t_1$–$t_5$ according to the present invention.

FIG. 3 is a temporal relationship diagram illustrating delays $t_1$–$t_5$ according to the present invention. In FIG. 3, 301 represents the DV recording medium; 302 represents the streaming state of the DV application; 303 represents the presence of DV data; 304 represent the transport state of the DV device.

All five delays vary between different DV devices, whether the DV device is available from a different manufacturer or from the same manufacturer of different models. Preferably, an application profiles each available DV device and queries a user to select a DV device from a list. Alternatively, default delays can be set within an application that can be adjusted by a user for achieving optimum results.

Figure 4:
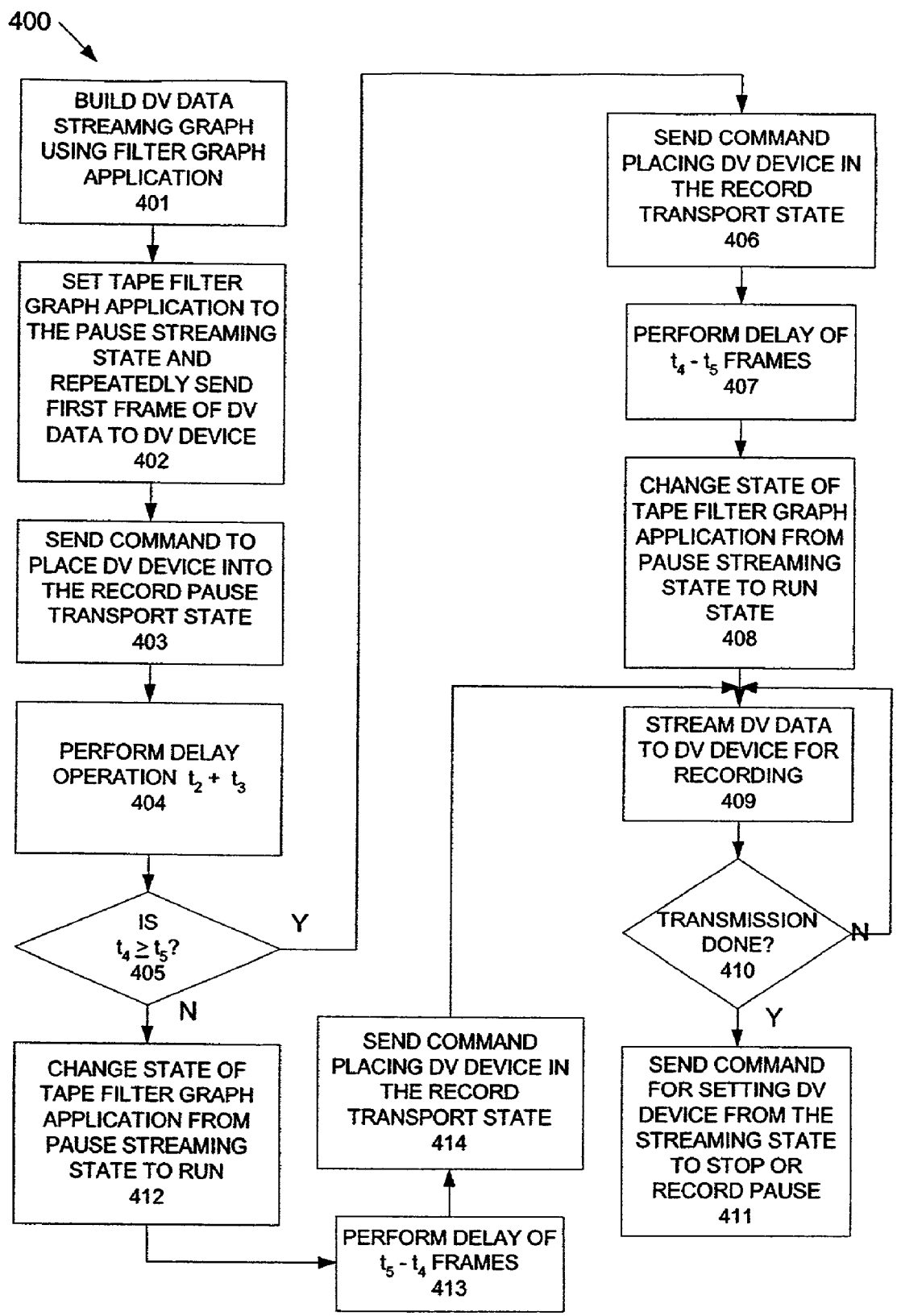
FIG. 4 is a detailed flow diagram for a stream DV data operation to a current location of a DV recording medium without losing the leading section of the streaming data according to the present invention.

FIG. 4 is a more detailed flow diagram 400 for a stream DV data operation to a current location of a DV recording medium without losing the leading section of the streaming data according to the present invention. At step 401, DV data is built using the tape filter graph application, such as the "DIRECTSHOW" Filter Graph Editor application available from Microsoft. During step 401, the DV device is in the VTR mode. At step 402, the tape filter graph application is set to the pause streaming state. While in the pause streaming state, the first frame of DV data is repeatedly sent to the DV device so that the recording mechanism of the DV deck locks (i.e., synchronizes) without advancing frames. At step 403, a command is sent to the DV device from the host device running the application that sets the DV device to the RECORD PAUSE transport state. Depending on the particular DV device, a wait operation of up to three (3) seconds is performed so that the DV device has received the first frame of DV data and the recording mechanism of the DV device has become synchronized with the DV data, thereby the DV device is ready to record. (This is accomplished when the first frame appears on the LCD (liquid crystal display) of the DV device.)

At step 404, a delay operation is performed that is the sum of delay $t_2$ and delay $t_3$ frames based on the DV device that is being used. At step 405, it is determined whether delay $t_4$ is greater that or equal to delay_$t_5$. If so, flow continues to step 406 where a command is sent to the DV device setting the transport state to RECORD. Flow continues to step 407 where a delay of ($t_4$–$t_5$) frames is performed. At step 408, the state of the tape filter graph application is changed from the pause streaming state to run state. At step 409, DV data is streamed to the DV device and recorded. At step 410, it is determined whether transmission of DV data to the DV device is complete. If so, flow continues to step 411 where a command is sent to the DV device for setting the DV device from the streaming state to STOP or to the RECORD PAUSE state. If at step 410, transmission of the DV data is not complete, flow returns to step 409.

If, at step 405, delay $t_4$ is not greater than or equal to delay $t_5$, then flow continues to step 412 where the state of the tape filter graph application is changed from the pause streaming state to run state. Flow continues to step 413 where a delay of ($t_5$–$t_4$) frames is performed. Flow continues to step 414 where a command is sent to the DV device setting the transport state to RECORD. Subsequently, flow continues to step 409.

To record DV data starting at a specific track number, the DV device is required to support an AV/C ATN control command for searching to a specific track number and an AV/C control command to set the DV device from the transport state to the PLAY PAUSE state. Additionally, the recording medium of the DV device must be formatted in a well-known manner with contiguous track numbers. It should be understood that while an application program will typically allow a user to select a particular time position, or time code, on a DV tape, a corresponding selected time position can be converted to an ATN in a well-known manner.

The following parameters are additional DV device parameters that must be controllable for the present invention to provide frame-accurate linear assembly editing. Parameter (F1) is the number of frames that are required to be pre-rolled when a DV device is transitioning from a PLAY PAUSE state to a RECORD PAUSE state. Parameter (F1) can be a positive or negative number. Parameter (F1) is identical to operating parameter (a3) described above. Parameter (F2) is the number of frames that are required to be pre-rolled when a DV device is transitioning from a RECORD PAUSE state to a RECORD state. Parameter (F2) is usually zero.

Figure 5:
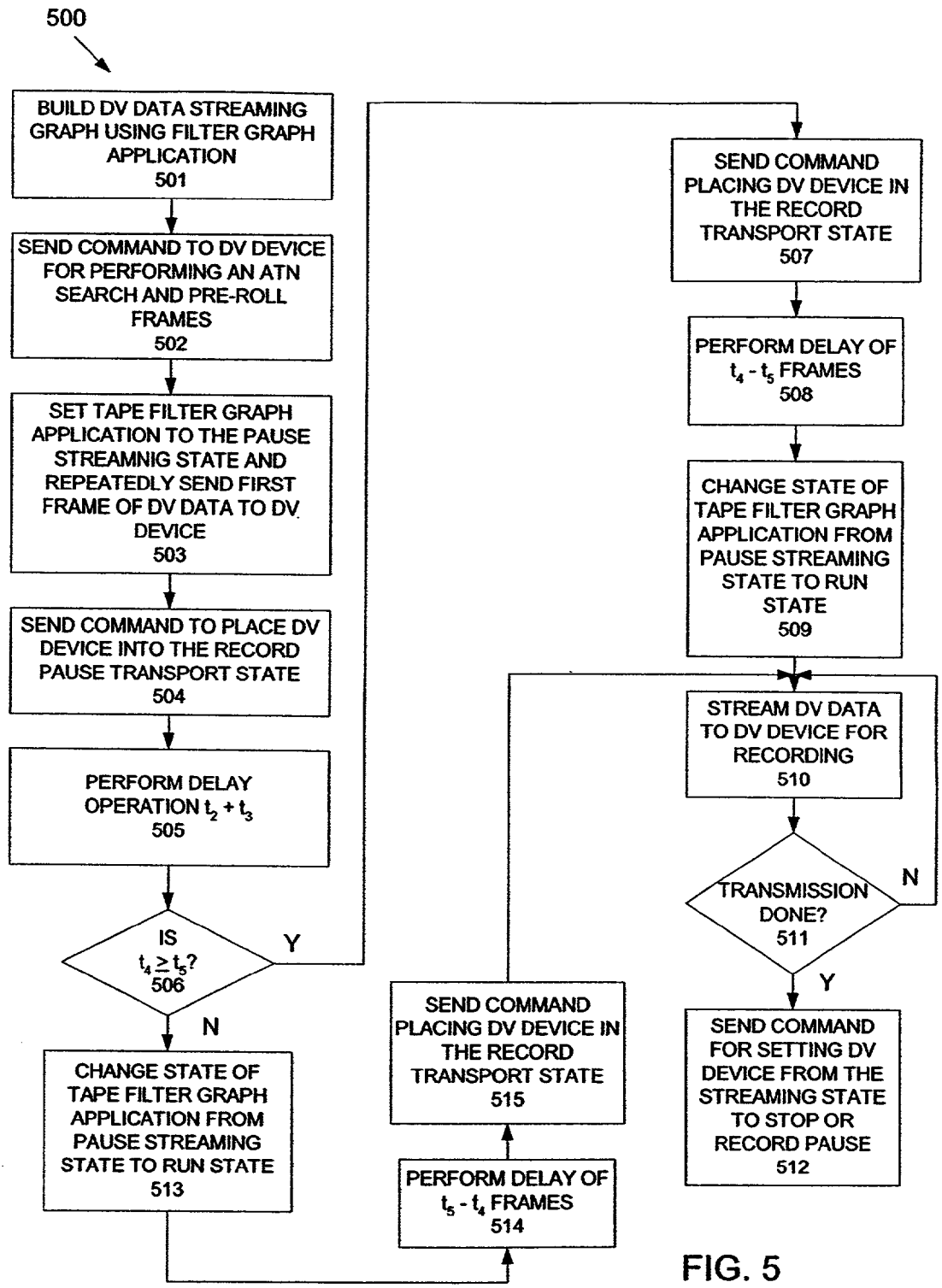
FIG. 5 shows a flow diagram for providing frame accurate linear assembly editing according to the present invention.

To illustrate the frame-accurate linear assembly editing aspect of the present invention, consider an absolute target track T1 on a DV medium, such as a DV tape, that is selected for the start of a recording. FIG. 5 shows a flow diagram 500 for providing frame accurate linear assembly editing according to the present invention. At step 501, DV data is built using a tape filter graph application with the DV device in the VTR mode. At step 502, a command is sent from the host device running the filter graph application to the DV device for performing an ATN search to track number (T1-F1) and an appropriate number of frames for the DV device are pre-rolled. Of course, steps 501 and 502 can be combined into a single operation.

At step 503, the tape filter graph application is set to the pause streaming state. While the filter graph application is in the pause streaming state, the first frame of DV data is repeatedly sent to the DV device so that the recording mechanism of the DV deck locks to the DV data without advancing frames. At step 504, a command is sent from the host device to the DV device setting the DV device to the RECORD PAUSE transport state. (Again, the DV device may change its current tape position during transport state change and is compensated for by pre-rolling frames, as previously described.)

At step 505, a delay operation is performed that is the sum of delay $t_2$ and delay $t_3$ frames for the particular DV device being used. At step 506, it is determined whether delay $t_4$ is greater that or equal to delay $t_5$. If so, flow continues to step 507 where a command is sent from the host device to the DV device setting the transport state to RECORD. Flow continues to step 508 where a delay operation of $(t_4-t_5)$ frames is performed. At step 509, the state of the tape filter graph application is changed from the PAUSE streaming state to run state. At step 510, DV data is steamed to the DV device and recorded. At step 511, it is determined whether transmission of DV data to the DV device is complete. If so, flow continues to step 512 where a command is sent to the DV device for setting the DV device from the streaming state to STOP or to the RECORD PAUSE state. If, at step 511, transmission of the DV data is not complete, flow returns to step 510.

If, at step 506, delay $t_4$ is not greater than or equal to delay $t_5$, then flow continues to step 513 where the state of the tape filter graph application is changed from the PAUSE streaming state to run state. Flow continues to step 514 where a delay operation of $(t_5-t_4)$ frames is performed. Flow continues to step 515 where a command is sent to the DV device setting the transport state to RECORD. Subsequently, flow continues to step 510.

The techniques of the present invention have been used with the "DIRECTSHOW" Filter Graph Editor application available from Microsoft for several currently-available DV devices. That is, the operation of the "DIRECTSHOW" Filter Graph Editor application available from Microsoft was modified to provide the techniques of the present invention, i.e., the pre-roll (a3) operations and the RECORD read wait (a4) operations. As a result, DV data was streamed to a DV device without losing the leading section of the streaming data.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for streaming digital video (DV) data to a DV device, the method comprising steps of:
   pre-rolling a predetermined number of frames of DV data;
   sending a command to the DV device to place the DV device in a RECORD PAUSE state;
   waiting a predetermined period of time for the DV device to become ready to record DV data;
   sending a command to the DV device to place the DV device in a RECORD transport state; sending DV data to the DV device;
   querying a user for information identifying the DV device; and
   receiving information from the user identifying the DV device,
   wherein the predetermined number of frames pre-rolled is based on the identified DV device.

2. The method according to claim 1, wherein the predetermined number of frames of DV data is based on a particular DV device.

3. The method according to claim 1, further comprising a step of sending a command to the DV device for performing an absolute track number search for a selected track number.

4. The method according to claim 1, wherein each frame of DV data is about 33 milliseconds in duration.

5. The method according to claim 1, wherein each frame of DV data is about 40 milliseconds in duration.

6. The method according to claim 1, wherein the step of querying the user includes a step of displaying a list identifying a plurality of DV devices.

7. The method according to claim 1, wherein the commands are sent to the DV device over an IEEE-1394 bus.

8. A system for streaming digital video (DV) data to a DV device, the system comprising:
   a host device running an application stored on a computer readable medium, the application performing the steps of
   pre-rolling a predetermined number of frames of DV data;
   sending a command to the DV de ice to place t e DV device in a RECORD PAUSE state;
   waiting a predetermined period of time for the DV device to become ready to record DV data; and
   sending a command to the DV device to place the DV device in a RECORD transport state, and then sending DV data to the DV device,
   wherein the host device queries a user for information identifying the DV device, and receives information from the user identifying the DV device,
   wherein the predetermined number of frames pre-rolled is based on the identified DV device.

9. The system according to claim 8, wherein the predetermined number of frames of DV data is based on a particular DV device.

10. The system according to claim 8, wherein the host device further sends a command to the DV device for performing an absolute track number search for a selected track number.

11. The system according to claim 8, wherein each frame of DV data is about 33 milliseconds in duration.

12. The system according to claim 8, wherein each frame of DV data is about 40 milliseconds in duration.

13. The system according to claim 8, wherein when the host device queries the user, the host device displays a list identifying a plurality of DV devices.

14. The system according to claim 8, wherein the host device sends the commands to the DV device over an IEEE-1394 bus.

15. A computer-readable medium having computer-executable commands executed on a computer for performing a method of streaming digital video (DV) data to a DV device comprising steps of:
- pre-rolling a predetermined number of frames of DV data;
- sending a command to the DV device to place the DV device in a RECORD PAUSE state;
- waiting a predetermined period of time for the DV device to become ready to record DV data;
- sending a command to the DV device to place the DV device in a RECORD transport state;
- sending DV data to the DV device;
- querying a user for information identifying the DV device; and
- receiving information from the user identifying the DV devices,
- wherein the predetermined number of frames pre-rolled is based on the identified DV device.

16. The computer-readable medium according to claim 15, wherein the predetermined number of frames of DV data is based on a particular DV device.

17. The computer-readable medium according to claim 15, further comprising a step of sending a command to the DV device for performing an absolute track number search for a selected track number.

18. The computer-readable medium according to claim 15, wherein each frame of DV data is about 33 milliseconds in duration.

19. The computer-readable medium according to claim 15, wherein each frame of DV data is about 40 milliseconds in duration.

20. The computer-readable medium according to claim 15, wherein the step of querying the user includes a step of displaying a list identifying a plurality of DV devices.

21. The computer-readable medium according to claim 15, wherein the commands are sent to the DV device over an IEEE-1394 bus.

* * * * *